United States Patent
Okai et al.

(10) Patent No.: US 10,793,938 B2
(45) Date of Patent: Oct. 6, 2020

(54) METHOD FOR PRODUCING BORON NITRIDE NANOTUBE-REINFORCED ALUMINUM COMPOSITE CASTING

(71) Applicant: HITACHI METALS, LTD., Tokyo (JP)

(72) Inventors: Makoto Okai, Tokyo (JP); Hideki Yamaura, Tokyo (JP); Kazutoshi Sugie, Tokyo (JP); Hideya Yamane, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/432,979

(22) Filed: Jun. 6, 2019

(65) Prior Publication Data

US 2019/0376169 A1 Dec. 12, 2019

(30) Foreign Application Priority Data

Jun. 7, 2018 (JP) .................................. 2018-109194

(51) Int. Cl.
| | |
|---|---|
| B22D 19/14 | (2006.01) |
| C22C 47/08 | (2006.01) |
| C22C 49/06 | (2006.01) |
| C22C 49/14 | (2006.01) |
| C01B 21/064 | (2006.01) |
| B82Y 30/00 | (2011.01) |
| B82Y 40/00 | (2011.01) |

(52) U.S. Cl.
CPC .......... *C22C 47/08* (2013.01); *C01B 21/0648* (2013.01); *C22C 49/06* (2013.01); *C22C 49/14* (2013.01); *B82Y 30/00* (2013.01); *B82Y 40/00* (2013.01); *C01P 2004/13* (2013.01)

(58) Field of Classification Search
CPC ........ B22D 19/14; B82Y 30/00; B82Y 40/00; C01P 2004/13; C22C 47/08; C22C 49/06; C22C 49/14
USPC ..................................................... 164/91, 97
See application file for complete search history.

(56) References Cited

U.S. PATENT DOCUMENTS 9,199,854 B2 * 12/2015 Chen et al. .......... C04B 35/6265

OTHER PUBLICATIONS

Xue, Yanming, et al., "Aluminum matrix composites reinforced with multi-walled boron nitride nanotubes fabricated by a high-pressure torsion technique," Materials and Design, vol. 88 (2015), pp. 451-460.

* cited by examiner

*Primary Examiner* — Kevin P Kerns
(74) *Attorney, Agent, or Firm* — Volpe and Koenig, P.C.

(57) ABSTRACT

Provided is a method for producing a boron nitride nanotube-reinforced aluminum composite casting, the method being capable of reducing cost. The method for producing a boron nitride nanotube-reinforced aluminum composite casting comprises the steps of: (a) mixing boron nitride nanotubes and a first aluminum matrix and then pelletizing the resulting mixture; (b) heating and subjecting pellets obtained in step (a) to melt mixing to obtain a melt; (c) cooling and solidifying the melt obtained in step (b) to obtain a master batch; and (d) subjecting the master batch obtained in step (c) and the second aluminum matrix to melt mixing, and then cooling and solidifying the resulting mixture.

6 Claims, 6 Drawing Sheets

METHOD FOR PRODUCING BORON NITRIDE NANOTUBE-REINFORCED ALUMINUM COMPOSITE CASTING

CROSS REFERENCE TO RELATED APPLICATIONS

The present application claims priority from Japanese patent application JP 2018-109194 filed on Jun. 7, 2018, the content of which is hereby incorporated by reference into this application.

BACKGROUND

Technical Field

The present invention relates to a method for producing a boron nitride nanotube-reinforced aluminum composite casting, to a boron nitride nanotube-reinforced aluminum composite casting, and to a master batch for producing a boron nitride nanotube-reinforced aluminum composite casting.

Background Art

Research and development of composites having a fine fibrous material dispersed in a metal matrix have been made in order to enhance the mechanical strength of metal materials. For example, composites having carbon nanotubes dispersed in a matrix of aluminum, which is a light metal, have been actively investigated. However, composites composed of carbon nanotubes and aluminum have the problem of insufficient interfacial bonding (adhesion) between the aluminum matrix and the carbon nanotubes and insufficient chemical stability of the carbon nanotubes in the aluminum matrix.

In recent years, boron nitride nanotube composites having boron nitride nanotubes dispersed in an aluminum matrix have been attracting attention (such a composite will be referred to as "BNNT/Al composite" hereinafter). Boron nitride nanotube (hereinafter referred to as "BNNT") is a nanotube (NT) having a tubular structure formed by a sheet made of alternately linked nitrogen (N) and boron (B) atoms. BNNT is considered to have mechanical properties comparable to those of carbon nanotube (CNT), which is a tubular structure formed by a sheet made of linked carbon (C) atoms, and have higher thermal stability than CNT.

For example, Yanming Xue et al. ("Aluminum matrix composites reinforced with multi-walled boron nitride nanotubes fabricated by a high-pressure torsion technique", Materials and Design, vol. 88 (2015), pp. 451-460) discloses a method of fabricating a BNNT/Al composite by mixing aluminum (Al) powder and BNNTs and subjecting the mixture to a torsion process at a pressure of as high as 5 GPa (high-pressure torsion technique). The method of Yanming Xue et al. is alleged to yield a BNNT/Al composite that has amorphous, extremely thin Al (BNO) layers (thickness: 2 to 5 nm) formed at the interfacial regions between the BNNTs and Al and that exhibits an increased tensile strength at room temperature, which is more than two times that of a pure Al material.

SUMMARY

However, the method of Yanming Xue et al. uses a special production technique, namely a high-pressure torsion technique, in which a torsional stress needs to be imposed on a material to be processed while a high pressure of about 5 GPa is applied uniformly to the entire material. Thus, this method is disadvantageous in terms of the geometric flexibility and geometric controllability of the composite to be obtained and has the problem of tending to involve high production cost. BNNTs themselves are an expensive material, and a low-cost production method is required to allow the use of BNNTs as an alternative to existing materials. The method of Yanming Xue et al. has the problem of difficulty in achieving cost reduction.

When mold casting, which allows great geometric flexibility and high geometric controllability and is advantageous for cost reduction, is used as a method for producing a BNNT/Al composite, mere direct addition of BNNTs to a large volume of melt of an aluminum matrix would, because of the density of BNNTs being lower than that of aluminum, result in floating of the added BNNTs on the surface of the aluminum melt and, in this case, the BNNTs are difficult to uniformly disperse and mix with the melt even by stirring them. Thus, there is the problem of inability to achieve enhanced mechanical strength.

The present invention provides a boron nitride nanotube-reinforced aluminum composite casting (hereinafter referred to as "BNNT/Al composite casting") producible at a lower cost than those of the prior art and having high mechanical strength and a method for producing the boron nitride nanotube-reinforced aluminum composite casting. It is also an object of the present invention to provide a master batch for producing a BNNT/Al composite casting, the master batch being suitable for use in fabrication of a BNNT/Al composite casting (this master batch will be referred to as "BNNT/Al master batch" hereinafter).

The present invention employs casting molding, which allows great geometric flexibility and high geometric controllability and is advantageous for cost reduction, as a BNNT/Al composite production technique, and provides a method for producing a BNNT/Al composite casting. Mere direct addition of BNNTs to a large volume of melt of an aluminum matrix would, because of the density of BNNTs being lower than that of aluminum, result in floating of the added BNNTs on the surface of the aluminum melt and, in this case, the BNNTs are difficult to uniformly disperse and mix with the melt even by stirring them.

According to the production method of the present invention, a master batch containing BNNTs and a first aluminum matrix is obtained through a pelletization step, and the master batch is introduced into and mixed with a melt of a second aluminum matrix or is heated and melted together with the second aluminum matrix and mixed with the second aluminum matrix, and then the resulting mixture is cooled and solidified. This has been found to yield a BNNT/Al composite having high mechanical strength in the form of a casting, with a low final content of the BNNTs. The present inventors have found that the pelletization enables the BNNTs to be wetted into the first aluminum matrix in the master batch containing the BNNTs in a relatively large amount and hence allows the BNNTs to be wetted into the aluminum matrix in a BNNT/Al composite casting obtained by melting and mixing of the master batch and a large amount of second aluminum matrix, thus leading to satisfactory mechanical strength of the casting.

The present invention includes the following inventions. Although in the following description, the production method is defined as including the case where the first aluminum matrix and the second aluminum matrix are different from each other, the production method may be interpreted as using aluminum matrices having the same composition. That is, the first aluminum matrix and the second aluminum matrix may have different compositions or the same composition.

[1] A method for producing a boron nitride nanotube-reinforced aluminum composite casting, comprising the following steps of:

(a) mixing boron nitride nanotubes and a first aluminum matrix and then pelletizing the resulting mixture;

(b) heating and subjecting pellets obtained in step (a) to melt mixing to obtain a melt;

(c) cooling and solidifying the melt obtained in step (b) to obtain a master batch; and (d) subjecting the master batch obtained in step (c) and the second aluminum matrix to melt mixing, and then cooling and solidifying the resulting mixture.

[2] The method according to [1], wherein step (d) is at least one of:

introducing the master batch obtained in step (c) into a melt of a second aluminum matrix, mixing the master batch and the melt of the second aluminum matrix, and then cooling and solidifying the resulting mixture; and heating and subjecting the master batch obtained in step (c) and the second aluminum matrix together to melt mixing, and then cooling and solidifying the resulting mixture.

[3] The method according to [1] or [2], wherein in step (a), the boron nitride nanotubes are used in an amount of 10% to 80% by mass based on the total amount of the boron nitride nanotubes and the first aluminum matrix.

[4] The method according to any one of [1] to [3], wherein in step (a), the pelletization is carried out at a pressure of 15 to 30 MPa.

[5] The method according to any one of [1] to [4], wherein in step (b), the pellets are heated to 700 to 900° C. to melt the pellets.

[6] The method according to any one of [1] to [5], wherein in step (b), stirring and allowing to stand are repeated to obtain the melt.

[7] A master batch for producing a boron nitride nanotube-reinforced aluminum composite casting, the master batch comprising an aluminum matrix and a plurality of boron nitride nanotubes dispersed in the aluminum matrix, the boron nitride nanotubes being wetted into the aluminum matrix.

[8] The master batch for producing a boron nitride nanotube-reinforced aluminum composite casting according to [7], comprising the boron nitride nanotubes in an amount of 10% to 80% by mass based on the total amount of the boron nitride nanotubes and the aluminum matrix.

[9] A boron nitride nanotube-reinforced aluminum composite casting comprising an aluminum matrix and boron nitride nanotubes, the boron nitride nanotubes being wetted into the aluminum matrix.

[10] The boron nitride nanotube-reinforced aluminum composite casting according to [9], comprising the boron nitride nanotubes in an amount of 0.1% to 8% by mass based on the total amount of the boron nitride nanotubes and the aluminum matrix.

A BNNT/Al composite casting obtained by the present invention has high mechanical strength. The present invention can provide a BNNT/Al composite casting producible at a low cost, and having high mechanical strength and a method for producing the BNNT/Al composite casting. The present invention can also provide a master batch for producing a BNNT/Al composite casting, the master batch being suitable for use in fabrication of a BNNT/Al composite casting.

DETAILED DESCRIPTION

The present invention relates to a method for producing a BNNT/Al composite casting, and the method is characterized by comprising the following steps of: (a) mixing BNNTs and a first aluminum matrix and then pelletizing the resulting mixture; (b) heating and subjecting pellets obtained in step (a) to melt mixing to obtain a melt; (c) cooling and solidifying the melt obtained in step (b) to obtain a master batch; and (d) subjecting the master batch obtained in step (c) and the second aluminum matrix to melt mixing, and then cooling and solidifying the resulting mixture (this method will also be referred to as "production method of the present invention"). Step (d) may be at least one of: introducing the master batch obtained in step (c) into a melt of a second aluminum matrix, mixing the master batch and the melt of the second aluminum matrix, and then cooling and solidifying the resulting mixture; and heating and subjecting the master batch obtained in step (c) and the second aluminum matrix together to melt mixing, and then cooling and solidifying the resulting mixture. According to the production method of the present invention, a master batch containing BNNTs and a first aluminum matrix is obtained through a pelletization step, and the master batch and the second aluminum matrix are subjected to melt mixing. Subsequently, the mixture thus obtained is cooled and solidified, in consequence of which a BNNT/Al composite casting having high mechanical strength is obtained with a low final content of the BNNTs. The pre-pelletization enables the BNNTs to be wetted into the first aluminum matrix in the master batch containing the BNNTs in a relatively large amount. This allows the BNTTs to be wetted into the aluminum matrix in a BNNT/Al composite casting obtained by melting and mixing of the master batch and a large amount of the second aluminum matrix, thus leading to satisfactory mechanical strength of the casting. The production method of the present invention, in which a BNNT/Al composite is obtained in the form of a casting, allows great geometric flexibility and high geometric controllability and is economical.

Hereinafter, the steps of the production method of the present invention will be described individually.

Step (a): Step of mixing BNNTs and first aluminum matrix and then pelletizing resulting mixture.

The pellets obtained through step (a) are solids or small solid pieces comprising BNNTs and the first aluminum matrix material compacted together. In step (b), each pellet is gradually melted, and the BNNTs can be mixed with the first aluminum matrix to give a melt in which the BNNTs are uniformly dispersed. This allows the BNNTs to be wetted into the first aluminum matrix in the master batch obtained in step (c). Stating that "BNNTs are wetted into an aluminum matrix" means that the contact interface between the BNNTs and the aluminum matrix can be observed in a TEM image of a thin film cross-section in a field of view and that any other substance, such as a compound resulting from a chemical reaction of the BNNTs and Al or an inclusion such as a void, does not exist at the observed interface. In TEM observation, it is important to make the sample in the form of a thin film, and controlling the thickness of the sample to 20 nm or less enables TEM observation to give an observation image indicating that the BNNTs are wetted into the aluminum matrix. Additionally, the fact that the addition of the BNNTs results in improvement in mechanical strength such as increases in the Young's modulus and tensile strength over the aluminum matrix also serves as an indicator of wetting of the BNNTs into the aluminum matrix. Specifically, the improvement in mechanical strength produced by the addition of the BNNTs over the aluminum matrix is such that the Young's modulus is increased by 1.5 times or more and/or the tensile strength is increased by two times or more. Such improvement in mechanical strength can lead to the conclusion that the BNNTs are wetted into the aluminum matrix.

In step (a), it is preferable that the mixing of the BNNTs and the first aluminum matrix be carried out by preparing a suspension containing the BNNTs and the first aluminum matrix and by subjecting the suspension to ultrasonication. This makes it possible, in particular, to prevent a situation where bundling of the BNNTs due to van der Waals attraction causes a decrease in the number of the interfaces between the aluminum matrix and the BNNTs in the resulting master batch. The solvent used in the suspension is not particularly limited as long as the solvent has a certain level of ability to disperse the BNNTs. For example, alcohols such as methanol, ethanol, and isopropyl alcohol can be used. Furthermore, in step (a), it is preferable that the suspension be filtered and the resulting residue be dried and compressed. This allows sorting out of the BNNTs and first aluminum matrix having a desired size or particle size.

It is preferable that the pellets obtained in step (a) be in the form of small prismatic pieces having a length of several millimeters to several centimeters or in the form of small cylindrical pieces having a diameter of several millimeters to several centimeters and a height of several millimeters to several centimeters. It is also preferable that the pellets obtained in step (a) be in a form in which the BNNTs and the first aluminum matrix are compacted together to a porosity of 10% or less and, specifically, it is preferable that the pellets have a density corresponding to 90% or more of 2.70 g/cm$^3$ which is the density of aluminum. In order to obtain pellets having such physical properties, the pressure used in the pelletization is preferably 10 MPa to 30 MPa, more preferably 15 MPa to 30 MPa, and particularly preferably 25 MPa to 30 MPa. The production method of the present invention can use pellets obtained at such a relatively low pressure to obtain a BNNT/Al composite having high mechanical strength in the form of a casting. The production method is therefore economically advantageous. The means for compression is not particularly limited, and examples of the compression means include a hand press machine and a hydraulic press machine. Additionally, in step (a), the BNNTs and the first aluminum matrix are uniformly mixed, and large aggregates of BNNTs are not formed. Thus, desired pellets can be obtained without addition of any additive such as Si. Also in this respect, the production method is economically advantageous. In the present specification, the numerical ranges indicated by the use of the word "to" refer to those including the values prior and subsequent to the word "to" as the lower and upper limits.

The number of walls constituting each of the BNNTs used in step (a) is preferably 2 to 10 and more preferably 2 to 5, in order to improve the strength of the BNNT/Al composite casting and achieve the economic advantage. If the BNNTs each consist of a single wall, the nanotubes may be partially damaged, and the damage may cause an insufficient strength of the casting. If the BNNTs are each constituted by more than 10 walls, the BNNTs have a small specific surface area, and thus the use of a large amount of the BNNTs, which is economically disadvantageous, is needed to increase the number of the interfaces between aluminum matrix and the BNNTs.

It is preferable for the BNNTs to be in the form of a powder composed of a collection of relatively short fibers. The length of the BNNTs is preferably about sub-micrometers to several micrometers, specifically 0.2 μm to 5.0 μm, in order for the BNNTs to function as a fibrous material and to be uniformly dispersed. If the length is less than the lower limit, the BNNTs fail to function as a fibrous material because of being too short. If the length is more than the upper limit, the BNNTs are strongly entangled and are difficult to disperse uniformly.

The first aluminum matrix used in step (a) may be pure aluminum or an alloy containing aluminum as a main component and further containing at least one metal selected from copper, manganese, silicon, magnesium, zinc, nickel, iron, chromium, and titanium. It is advantageous that the alloy containing aluminum as a main component be an alloy in which the content of the metal other than aluminum is 10% by mass or less based on the total amount of the alloy, and it is preferable that the metal other than aluminum be a metal capable of forming a eutectic structure with aluminum during cooling and solidification in subsequent steps (c) and (d). A person skilled in the art would be able to adjust the content of the metal as appropriate without impairing the effect of the present invention.

It is preferable for the first aluminum matrix to be a powder. The particle size (diameter) of the first aluminum matrix is about several tens of micrometers to several millimeters in order to prevent a surface oxide film from being formed during heating to make melting difficult and in order to achieve uniform dispersion. To be specific, the particle size is preferably 30 μm to 2.0 mm and more preferably 30 μm to 300 μm. If the particle size is less than the lower limit, the formation of a surface oxide film makes it difficult to melt the matrix by heating. If the particle size is more than the upper limit, the specific surface area of the matrix is so small that the matrix is difficult to uniformly disperse by a technique such as ultrasonication.

In step (a), the BNNTs are preferably used in an amount of 10% to 80% by mass, more preferably in an amount of 20% to 60% by mass, particularly preferably in an amount of 30% to 60% by mass, based on the total amount of the BNNTs and the first aluminum matrix. With the use of pellets containing the BNNTs in such an amount, the BNNT/Al composite casting obtained in step (d) can exhibit desired mechanical strength while the content of the BNNTs in the BNNT/Al composite casting is as low as about 0.1% to 8% by mass. Since BNNTs are expensive, the use of pelletized BNNTs is preferable also in economic terms. The desired mechanical strength refers to a Young's modulus 1.5 times or more that of the aluminum matrix and/or a tensile strength two times or more that of the aluminum matrix. It is economically advantageous that the content of the BNNTs in the master batch be 10 to 100 times the content of the BNNTs in the BNNT/Al composite casting obtained in step (d). If the amount of the BNNTs added is more than 80% by mass, the pelletization by compression is difficult, and the subsequent uniform melting under stirring is also difficult.

Step (b): Step of heating and subjecting pellets obtained in step (a) to melt mixing to obtain a melt.

The melt obtained in step (b) can be uniform, which allows the BNNTs to be wetted into the first aluminum matrix in a master batch obtained as a result of cooling and solidification in step (c) subsequent to step (b).

In step (b), the melting of the pellets is preferably performed by heating the pellets to 700° C. to 900° C., more preferably to 700° C. to 800° C., in order to readily melt aluminum at a temperature sufficiently higher than the melting point of aluminum while minimizing the thermal damage to the BNNTs. In terms of safety and economy, the temperature rise rate is preferably 10 to 80° C./min and more preferably 30 to 70° C./min. Further, in order to uniformly mix the BNNTs and the aluminum matrix, it is preferable that stirring and allowing to stand be repeated in obtaining the melt. In order to minimize the oxidation reaction of the aluminum matrix, it is preferable to perform the stirring gently. The details of the conditions such as the stirring speed, the stirring time, and the standing time depend on, for example, the amounts of the materials used for production, and a person skilled in the art would be able to set the conditions as appropriate.

Step (c): Step of cooling and solidifying melt obtained in step (b) to obtain a master batch.

Step (c) results in a master batch in which the BNNTs are wetted into the first aluminum matrix. In step (c), it is preferable that the cooling for obtaining the master batch be rapid cooling in order to form a fine eutectic structure. The shape and size of the master batch are not particularly limited, but the master batch may be in the form of prismatic pieces or cylindrical pieces which may have a length of several centimeters to several tens of centimeters.

Step (d): Step of subjecting the master batch obtained in step (c) and the second aluminum matrix to melt mixing, and then cooling and solidifying the resulting mixture. Specifically, step of introducing master batch obtained in step (c) into melt of second aluminum matrix, mixing master batch and melt of second aluminum matrix, and then cooling and solidifying resulting mixture, or heating and subjecting master batch obtained in step (c) and second aluminum matrix together to melt mixing, and then cooling and solidifying resulting mixture.

In step (d), the use of a master batch in which the BNNTs are wetted into the first aluminum matrix allows the BNNTs to be uniformly dispersed in the aluminum melt without causing the BNNTs to float on the surface of the melt or be partially localized or entangled. Consequently, the BNNTs can be wetted into the aluminum matrix in the resulting casting, and the resulting casting can have high mechanical strength. In step (d), a desired casting can be obtained without addition of any additive, and this is also economically advantageous. It is preferable for the cooling to be rapid cooling in order to form a fine eutectic structure.

In step (d), it is preferable in economic terms that the master batch be mixed with the second aluminum matrix to give a total amount 10 to 100 times the amount of the master batch. For example, 10.0 kg of the master batch containing 30% by mass of the BNNTs can be mixed with 290.0 kg of the second aluminum matrix to fabricate a BNNT/Al composite casting containing 1% by mass of the BNNTs. Either one master batch or more than one master batches may be used.

The second aluminum matrix used in step (d) may be pure aluminum or an alloy containing aluminum as a main component and further containing at least one metal selected from copper, manganese, silicon, magnesium, zinc, nickel, iron, chromium, and titanium. It is advantageous that the alloy containing aluminum as a main component be an alloy in which the content of the metal other than aluminum is 10% by mass or less based on the total amount of the alloy, and it is preferable that the metal other than aluminum be a metal capable of forming a eutectic structure with aluminum during cooling and solidification. A person skilled in the art would be able to adjust the content of the metal as appropriate without impairing the effect of the present invention. The second aluminum matrix may have a composition identical to or different from that of the first aluminum matrix.

The second aluminum matrix used can be a powder. The particle size (diameter) of the second aluminum matrix is about several tens of micrometers to several millimeters in order to prevent a surface oxide film from being formed during heating to make melting difficult and in order to achieve uniform dispersion. To be specific, the particle size is preferably 30 µm to 2.0 mm and more preferably 30 µm to 300 µm. If the particle size is less than the lower limit, the formation of a surface oxide film makes it difficult to melt the matrix by heating. If the particle size is more than the upper limit, the specific surface area of the matrix is so small that the matrix is difficult to uniformly disperse by a technique such as ultrasonication.

The second aluminum matrix used can be a bulk of aluminum. In this case, the bulk of aluminum is melted, and then the master batch is introduced into the aluminum melt. The use of a bulk of aluminum eliminates the need for powderization and is thus economical. The melting of the bulk of aluminum is preferably carried out by heating to 700° C. to 900° C., more preferably to 700° C. to 800° C. In terms of safety and economy, the temperature rise rate is preferably 10 to 80° C./min and more preferably 30 to 70° C./min. It is preferable that after introduction of the master batch into the aluminum melt, stirring and allowing to stand be repeated in order to achieve uniform mixing. In order to minimize the oxidation reaction of the aluminum matrix, it is preferable to perform the stirring gently. The details of the conditions such as the stirring speed, the stirring time, and the standing time depend on, for example, the amounts of the materials used for production, and a person skilled in the art would be able to set the conditions as appropriate.

It is also possible to heat and melt a bulk of aluminum and the master batch together and mix the aluminum and the master batch by stirring. The use of the collective heating simplifies the production steps and is thus economical. The melting is preferably carried out by heating to 700° C. to 900° C., more preferably to 700° C. to 800° C. In terms of safety and economy, the temperature rise rate is preferably 10 to 80° C./min and more preferably 30 to 70° C./min. It is preferable that stirring and allowing to stand be repeated after the melting in order to achieve uniform mixing. In order to minimize the oxidation reaction of the aluminum matrix, it is preferable to perform the stirring gently. The details of the conditions such as the stirring speed, the stirring time, and the standing time depend on, for example, the amounts of the materials used for production, and a person skilled in the art would be able to set the conditions as appropriate.

In step (d), the temperature of the melt of the second aluminum matrix or the heating temperature is preferably 700° C. to 900° C. and more preferably 700° C. to 800° C. in order to readily melt the second aluminum matrix at a temperature sufficiently higher than the melting point of the second aluminum while minimizing the thermal damage to the BNNTs. In order to uniformly mix the BNNTs and the second aluminum matrix, it is preferable that stirring and allowing to stand be repeated. In order to minimize the oxidation reaction of the second aluminum matrix, it is preferable to perform the stirring gently. The details of the conditions such as the stirring speed, the stirring time, and the standing time depend on, for example, the amounts of the materials used for production, and a person skilled in the art would be able to set the conditions as appropriate.

According to an embodiment of the production method of the present invention, as described above, a master batch composed of a mixture of BNNTs and aluminum is prepared, and then the steps such as introduction of the master batch into an aluminum melt are performed to fabricate a BNNT/Al composite casting. In this method, a BNNT powder and an aluminum powder are mixed to form pellets, the pellets are heated and melted, and the melt is cooled and solidified to form a master batch having the BNNT powder dispersed in the aluminum matrix. The BNNT/Al composite casting production method further includes: mixing the master batch and an aluminum melt and then cooling and solidifying the resulting mixture to form a BNNT/Al composite casting; or heating and subjecting the master batch and solid aluminum together to melt mixing, and then cooling and solidifying the resulting mixture to form a BNNT/Al composite casting.

Hereinafter, an embodiment of the production method of the present invention will be described with reference to FIGS. 1 and 2.

Figure 1:
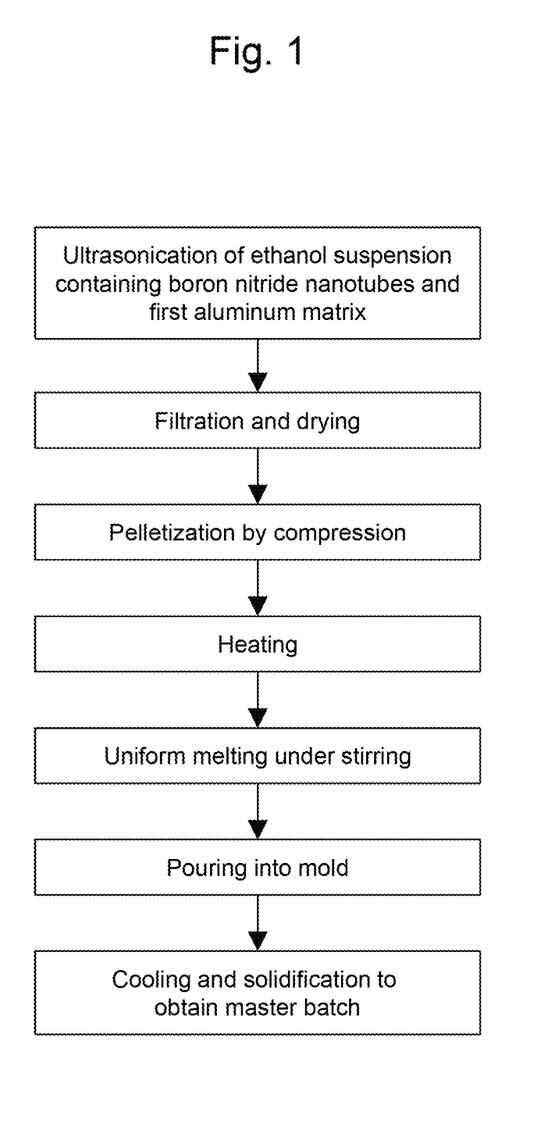
FIG. 1 is a flow chart illustrating an embodiment of the method for producing a BNNT/Al master batch according to the present invention.
Figure 2:
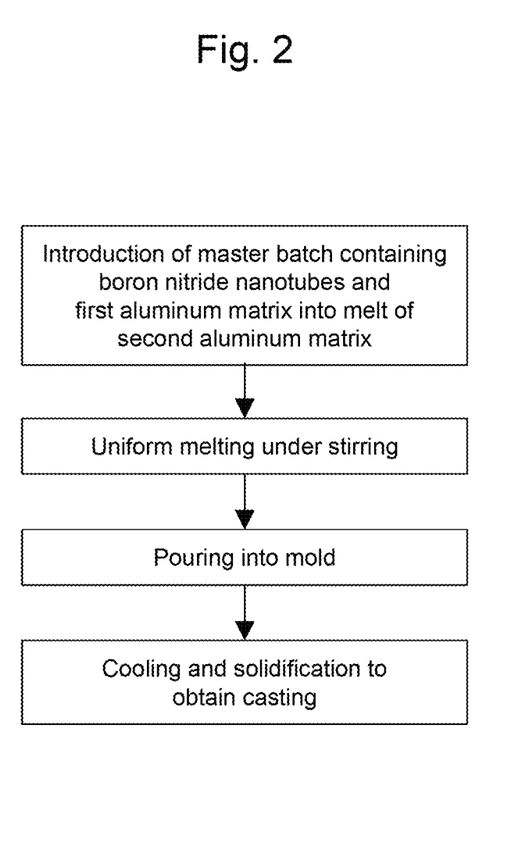
FIG. 2 is a flow chart illustrating an embodiment of the method for producing a BNNT/Al composite casting according to the present invention.

FIG. 1 illustrates the step of preparing a BNNT/Al master batch. First, BNNTs and a first aluminum matrix are mixed. The mixture is then introduced into an ethanol solution, which is thoroughly stirred. This is followed by ultrasonication to uniformly disperse the BNNTs and the first aluminum matrix. The resulting dispersion is filtered, and the residue is dried and then pelletized by compression. The resulting pellets are heated and melted uniformly under stirring. The melt is poured into a mold, in which the melt is cooled and solidified to obtain a master batch. Next, the step of fabricating a casting from the master batch will be described with reference to FIG. 2. The master batch comprising the BNNTs and the first aluminum matrix is introduced into a melt of a second aluminum matrix and is melted uniformly under stirring. The resulting melt is poured into a mold, in which the melt is cooled and solidified to obtain a casting.

According to another embodiment of the production method of the present invention, a master batch comprising a mixture of BNNTs and aluminum is prepared, and the master batch and a second aluminum matrix in the form of a powder or bulk are heated together to fabricate a BNNT/Al composite casting. This embodiment will be described in detail. First, BNNTs and a first aluminum matrix are mixed. The mixture is then introduced into an ethanol solution, which is thoroughly stirred. This is followed by ultrasonication to uniformly disperse the BNNTs and the first aluminum matrix. The resulting dispersion is filtered, and the residue is dried and then pelletized by compression. The resulting pellets are heated and melted uniformly under stirring. The melt is poured into a mold, in which the melt is cooled and solidified to obtain a master batch. Subsequently, the master batch and the second aluminum matrix in the form of a powder or bulk are heated together and uniformly melted and mixed. The resulting melt is poured into a mold, in which the melt is cooled and solidified to obtain a casting.

The present invention also relates to a BNNT/Al master batch. Specifically, the present invention relates to a master batch for producing a BNNT/Al composite casting, the master batch being intended to blend BNNTs and a first aluminum matrix into a second aluminum matrix, the master batch being characterized in that the BNNTs are wetted into the first aluminum matrix (this master batch will also be referred to as "master batch of the present invention" hereinafter). The master batch of the present invention can be used to produce a BNNT/Al composite casting by a method comprising the step of introducing the master batch into a melt of a second aluminum matrix, mixing the master batch and the melt of the second aluminum matrix, and then cooling and solidifying the resulting mixture, or heating and subjecting the master batch and the second aluminum matrix together to melt mixing, and then cooling and solidifying the resulting mixture. The master batch of the present invention can be produced by a method comprising steps (a) to (c) described above for the production method of the present invention. The master batch of the present invention preferably comprises the BNNTs in an amount of 10% to 80% by mass, more preferably in an amount of 20% to 60% by mass, particularly preferably in an amount of 30% to 60% by mass, based on the total amount of the BNNTs and the first aluminum matrix. Despite being contained in such a large amount, the BNNTs are wetted into the first aluminum matrix. A BNNT/Al composite casting finally obtained by the use of the master batch has high mechanical strength despite the content of the BNNTs being low based on the total aluminum matrix.

The present invention also relates to a BNNT/Al composite casting comprising an aluminum matrix and BNNTs, the BNNTs being wetted into the aluminum matrix (this casting will also be referred to as "casting of the present invention" hereinafter). The casting of the present invention has high mechanical strength because of the wetting of the BNNTs into the aluminum matrix. The BNNT/Al composite casting of the present invention can be produced by a method comprising steps (a) to (d) described above for the production method of the present invention. The casting of the present invention preferably comprises the BNNTs in an amount of 0.1% to 8% by mass, more preferably in an amount of 0.3% to 6% by mass, based on the total amount of the BNNTs and the aluminum matrix (the first aluminum matrix plus the second aluminum matrix). Despite the low content of the BNNTs, the casting has high mechanical strength. In order to enhance the mechanical strength of the casting, it is preferable that the content of the BNNTs be equal to or higher than the lower limit mentioned above. In order to disperse the BNNTs uniformly, it is preferable that the content of the BNNTs be equal to or lower than the upper limit mentioned above.

A BNNT/Al composite casting obtained by the production method of the present invention can exhibit a Young's modulus of 100 GPa to 350 GPa when the mechanical strength of the casting is measured according to JIS Z 2241. A BNNT/Al composite casting obtained by the production method of the present invention can exhibit a tensile strength of 75 MPa to 500 MPa when the mechanical strength of the casting is measured according to JIS Z 2241.

EXAMPLES

Hereinafter, the present invention will be described based on examples. The present invention is not limited by the examples given below.

[1: Fabrication of BNNT/Al Composite Casting]

Example 1

The following describes an example where the content of BNNTs in a master batch is 20% by mass.

(1) Preparation of Master Batch 500 ml of an ethanol suspension of 2.0 g of BNNTs (manufactured by TEKNA; trade name: BNNT-P) and 8.0 g of particles of a first aluminum matrix (manufactured by Wako Pure Chemical Industries, Ltd.; trade name: Aluminum Powder (CAS No: 7429-90-5); a mixture of particles with particle sizes ranging from 53 to 150 μm) was prepared and subjected to ultrasonication. The resulting dispersion was filtered, and the residue was dried and poured into a press mold, and then pelletized by compression. The filtration was carried out using a common suction filtration apparatus. The filter paper used had a pore size of 1 micrometer. The residue on the filter paper, which was a mixture of the BNNTs and the particles of the first aluminum matrix, was placed into an aluminum tray and dried on a hot plate under stirring. The temperature of the hot plate was set to 250° C. The compression pressure in the pelletization was 15 MPa. The resulting pellets had a size with a diameter of 5 cm and a height of 5 cm.

Figure 3:
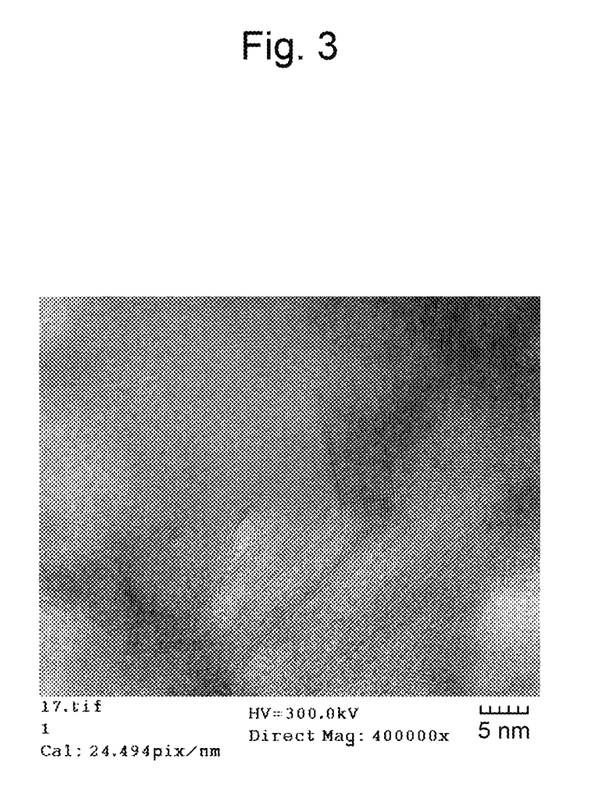
FIG. 3 is a TEM image of a cross-section of a thin film prepared from a master batch obtained in Example 1.

Next, the pellets (about several to several tens of the pellets) were placed in a heat-resistant container, heated to about 700° C. to 800° C. and gently stirred to give a uniform melt. The heating was carried out using a kiln-type heating furnace, and the temperature was raised at a rate of 50° C./min. The heat-resistant container used was made of alumina. Once 700° C. was reached, the lid of the furnace was opened, then the contents of the heat-resistant container were gently stirred with an alumina rod for 1 minute, and then the furnace was lidded and left for 10 minutes, after which the lid was opened again and the contents of the heat-resistant container were stirred for 1 minute. This operation was repeated, and 1-minute stirring was performed 5 times in total. It is thought that the BNNTs become wetted into the first aluminum matrix through the stirring operation. Next, the melt was poured into a mold, in which the melt was cooled and solidified to give a master batch. The size of the obtained master batch was 10 cm in length, 5 cm in width, and 20 cm in height. In the master batch, the amount of the BNNTs is 20% by mass based on the total amount of the BNNTs and the first aluminum matrix. In FIG. 3, the objects seen as being line-shaped are BNNTs, which are observed to lie over one another in the first aluminum matrix.

(2) Fabrication of Casting 10.0 g of the master batch was introduced into a melt of 90.0 g of a second aluminum matrix (manufactured by Wako Pure Chemical Industries, Ltd.; trade name: Aluminum Powder (CAS No: 7429-90-5); a mixture of particles with particle sizes ranging from 53 to 150 μm) at about 700° C. to 800° C., and the master batch was melted uniformly under gentle stirring. The stirring operation was repeated in the same manner as in the preparation of the master batch. Next, the resulting melt was poured into a mold, in which the melt was cooled and solidified to obtain a BNNT/Al composite casting. In the casting, the amount of the BNNTs is 2% by mass based on the total amount of the BNNTs and the aluminum matrix (the first aluminum matrix plus the second aluminum matrix).

Example 2

The following describes an example where the content of BNNTs in a master batch is 50% by mass.

(1) Preparation of Master Batch 500 ml of an ethanol suspension of 5.0 g of BNNTs (manufactured by TEKNA; trade name: BNNT-P) and 5.0 g of particles of a first aluminum matrix (manufactured by Wako Pure Chemical Industries, Ltd.; trade name: Aluminum Powder (CAS No: 7429-90-5); a mixture of particles with particle sizes ranging from 53 to 150 μm) was prepared and subjected to ultrasonication. This was followed by procedures identical to those in Example 1, and thus a master batch was prepared. In the master batch, the amount of the BNNTs is 50% by mass based on the total amount of the BNNTs and the first aluminum matrix.

(2) Fabrication of Casting 10.0 g of the master batch was introduced into a melt of 990.0 g of a second aluminum matrix (manufactured by Wako Pure Chemical Industries, Ltd.; trade name: Aluminum Powder (CAS No: 7429-90-5); a mixture of particles with particle sizes ranging from 53 to 150 μm) at about 700° C. to 800° C., and the master batch was melted uniformly under gentle stirring. The stirring operation was repeated in the same manner as in the preparation of the master batch. Next, the resulting melt was poured into a mold, in which the melt was cooled and solidified to obtain a BNNT/Al composite casting. In the casting, the amount of the BNNTs is 0.5% by mass based on the total amount of the BNNTs and the aluminum matrix (the first aluminum matrix plus the second aluminum matrix).

Comparative Example 1

The following describes a comparative example where the pelletization step (step (a)) and subsequent steps of the production method of the present invention are not performed.

500 ml of an ethanol suspension of 2.0 g of BNNTs (manufactured by TEKNA; trade name: BNNT-P) and 8.0 g of particles of a first aluminum matrix (manufactured by Wako Pure Chemical Industries, Ltd.; trade name: Aluminum Powder (CAS No: 7429-90-5); a mixture of particles with particle sizes ranging from 53 to 150 μm) was prepared and subjected to ultrasonication. The resulting dispersion was filtered, and the residue was dried. The filtration was carried out using a common suction filtration apparatus. The filter paper used had a pore size of 1 micrometer. The residue on the filter paper, which was a mixture of the BNNTs and the particles of the first aluminum matrix, was placed into an aluminum tray and dried on a hot plate under stirring. The temperature of the hot plate was set to 250° C.

Next, 10.0 g of the mixture in the form of a powder was introduced into a melt of 90.0 g of a second aluminum matrix (manufactured by Wako Pure Chemical Industries, Ltd.; trade name: Aluminum Powder (CAS No: 7429-90-5); particle size: 53 to 150 μm) at about 700° C. to 800° C., and the mixture and the melt were gently stirred. However, the mixture floated on the surface of the aluminum melt, and uniform mixing was not able to be achieved.

[2: Methods for Evaluation of Master Batch and Casting]

(1) TEM (Transmission Electron Microscope) Observation

A 1-cm-square test sample was cut out from the casting using a lathe and embedded in a resin, and then the surface of the specimen was mirror-polished. After that, a focused ion beam micromachining apparatus was used to fix a 100-μm-square, 100-nm-thick test sample to a grid for transmission electron microscope observation. Subsequently, an argon sputtering apparatus was used to form the sample into a thin film with a thickness of 10 nm or less, and the thin film sample was observed with a transmission electron microscope at an accelerating voltage of 300 kV. When, in the TEM image, an interface was observed at which the BNNTs and the aluminum matrix were in contact and any other substance, such as a compound resulting from a chemical reaction of the BNNTs and Al or an inclusion such as a void, did not exist at the interface, the BNNTs were evaluated to be wetted into the aluminum matrix.

(2) Measurement of Mechanical Strength

The mechanical strength was measured according to JIS Z 2241.

[3: Results of Evaluation of Casting]

(1) Result of TEM Observation

Figure 4:
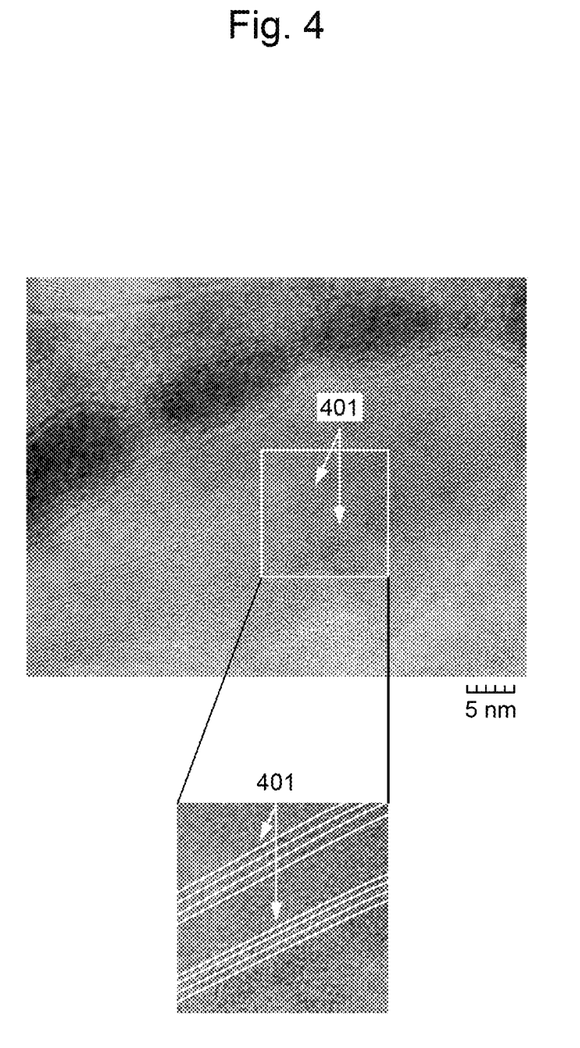
FIG. 4 is a TEM image of a cross-section of a thin film prepared from a BNNT/Al composite casting of Example 1.
Figure 5:
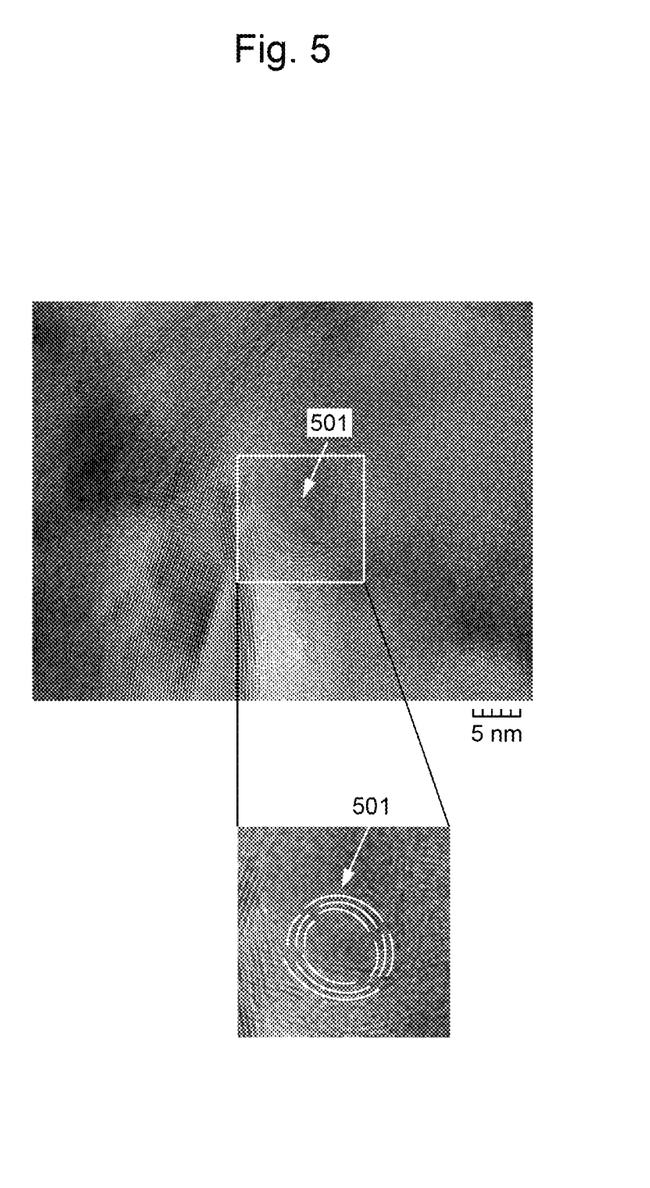
FIG. 5 is a TEM image of a cross-section of a thin film prepared from the BNNT/Al composite casting of Example 1.
Figure 6:
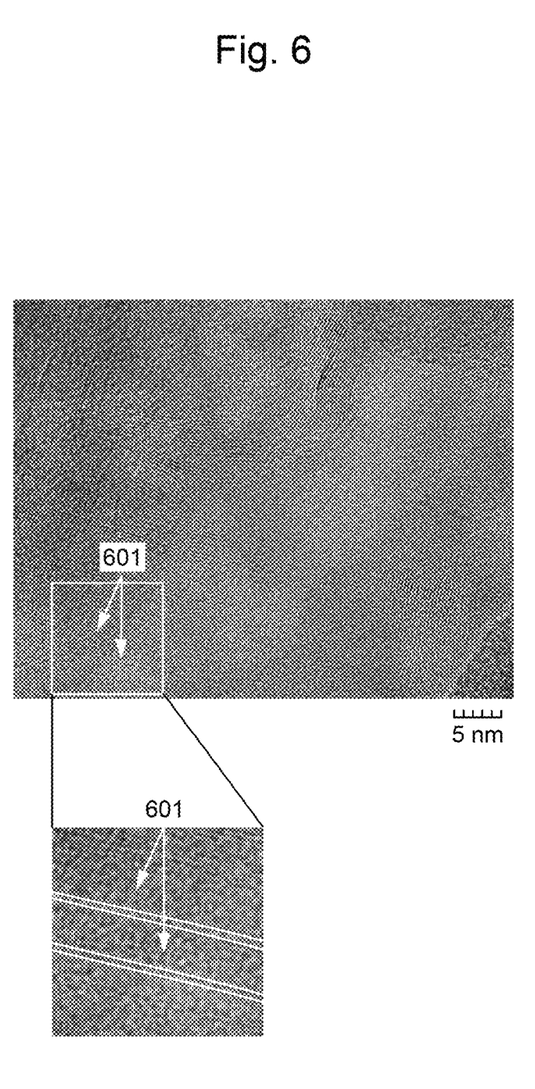
FIG. 6 is a TEM image of a cross-section of a thin film prepared from the BNNT/Al composite casting of Example 1.

A TEM image of a cross-section of a thin film prepared from the master batch obtained in Example 1 is shown in FIG. 3. As seen from FIG. 3, the BNNTs and aluminum are not reacted, no space or void is observed at the interface between the BNNTs and aluminum, and aluminum lies on the surface of the BNNTs (i.e., no inclusion exists). This confirms that the BNNTs are wetted into the first aluminum matrix. TEM images of a cross-section of a thin film prepared from the BNNT/Al composite casting obtained in Example 1 are shown in FIGS. 4 to 6. In FIG. 4, many parallel lines are seen. For example, a pair of four parallel lines corresponds to a multi-walled BNNT 401. In FIG. 5, an end portion 501 of a multi-walled BNNT is seen. In FIG. 6, a double-walled BNNT 601 is seen. In all the TEM images, the BNNTs and aluminum are not reacted, and aluminum lies on the surface of the BNNTs. This confirms that the BNNTs are wetted into aluminum.

(2) Result of Measurement of Mechanical Strength

As a result of the measurement of the mechanical strength of the BNNT/Al composite casting of Example 1 (BNNT content: 2% by mass), the Young's modulus was determined to be 110 GPa, which was 1.62 times that of pure aluminum (68 GPa). The tensile strength was determined to be 420 MPa, which was 2.55 times that of pure aluminum (165 MPa). It was thus demonstrated that the BNNT/Al composite casting obtained through addition of BNNTs according to the production method of the present invention had significantly improved mechanical strength as compared to aluminum.

As a result of the measurement of the mechanical strength of the BNNT/Al composite casting of Example 2 (BNNT content: 0.5% by mass), the Young's modulus was determined to be 120 GPa, which was 1.76 times that of pure aluminum (68 GPa). The tensile strength was determined to be 440 MPa, which was 2.67 times that of pure aluminum (165 MPa). It was thus demonstrated that the BNNT/Al composite casting obtained through addition of BNNTs according to the production method of the present invention had significantly improved mechanical strength as compared to aluminum.

DESCRIPTION OF SYMBOLS

401 Multi-walled BNNT
501 End portion of multi-walled BNNT
601 Double-walled BNNT

What is claimed is:

1. A method for producing a boron nitride nanotube-reinforced aluminum composite casting, comprising the following steps of:
   (a) mixing boron nitride nanotubes and a first aluminum matrix and then pelletizing the resulting mixture;
   (b) heating and subjecting pellets obtained in step (a) to melt mixing to obtain a melt;
   (c) cooling and solidifying the melt obtained in step (b) to obtain a master batch; and
   (d) subjecting the master batch obtained in step (c) and a second aluminum matrix to melt mixing, and then cooling and solidifying the resulting mixture.

2. The method according to claim 1, wherein step (d) is at least one of:
   introducing the master batch obtained in step (c) into a melt of the second aluminum matrix, mixing the master batch and the melt of the second aluminum matrix, and then cooling and solidifying the resulting mixture; and
   heating and subjecting the master batch obtained in step (c) and the second aluminum matrix together to melt mixing, and then cooling and solidifying the resulting mixture.

3. The method according to claim 1, wherein in step (a), the boron nitride nanotubes are used in an amount of 10% to 80% by mass based on the total amount of the boron nitride nanotubes and the first aluminum matrix.

4. The method according to claim 1, wherein in step (a), the pelletization is carried out at a pressure of 15 to 30 MPa.

5. The method according to claim 1, wherein in step (b), the pellets are heated to 700 to 900° C. to melt the pellets.

6. The method according to claim 1, wherein in step (b), stirring and allowing to stand are repeated to obtain the melt.

* * * * *